United States Patent
Chiang et al.

[19]

[11] Patent Number: 6,160,846
[45] Date of Patent: *Dec. 12, 2000

[54] APPARATUS AND METHOD FOR OPTIMIZING THE RATE CONTROL IN A CODING SYSTEM

[75] Inventors: Tihao Chiang, Plainsboro; Huifang Sun, Cranbury, both of N.J.; Wilson Kwok; Max Chien, both of San Jose, Calif.; Ya-Qin Zhang, Cranbury, N.J.

[73] Assignees: Sarnoff Corporation, Princeton, N.J.; Sharp Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,228

[22] Filed: Oct. 23, 1996

Related U.S. Application Data

[60] Provisional application No. 60/007,014, Oct. 25, 1995, provisional application No. 60/007,016, Oct. 25, 1995, and provisional application No. 60/020,872, Jun. 28, 1996.

[51] Int. Cl.$^7$ ....................................................... H04N 7/50
[52] U.S. Cl. ............................ 375/240.05; 375/240.16; 375/240.19
[58] Field of Search .................................... 348/384, 390, 348/400, 401, 402, 403, 405, 407, 409–413, 415, 416, 699; 382/232–245, 248–253, 279–281; H04N 7/50, 7/12

[56] References Cited

U.S. PATENT DOCUMENTS

| | | | |
|---|---|---|---|
| 5,038,209 | 8/1991 | Hang | 348/419 |
| 5,134,476 | 7/1992 | Aravind et al. | 358/133 |
| 5,144,424 | 9/1992 | Savatier | 358/133 |
| 5,144,426 | 9/1992 | Tanaka et al. | 358/133 |
| 5,231,484 | 7/1993 | Gonzales et al. | 348/405 |
| 5,253,059 | 10/1993 | Ansari et al. | 358/138 |
| 5,291,281 | 3/1994 | Paik et al. | 348/384 |
| 5,315,670 | 5/1994 | Shapiro | 382/56 |
| 5,396,567 | 3/1995 | Jass | 382/251 |
| 5,418,617 | 5/1995 | Naimpally et al. | 348/413 |
| 5,440,345 | 8/1995 | Shimoda | 348/411 |
| 5,491,513 | 2/1996 | Wickstrom et al. | 348/390 |
| 5,576,767 | 11/1996 | Lee et al. | 348/413 |
| 5,592,226 | 1/1997 | Lee et al. | 348/413 |
| 5,594,504 | 1/1997 | Ebrahimi | 348/416 |
| 5,606,371 | 2/1997 | Gunnewiek et al. | 348/405 |

OTHER PUBLICATIONS

Copy of International Search Report dated Feb. 19, 1997, from corresponding international application.

*Primary Examiner*—Howard W. Britton
*Attorney, Agent, or Firm*—William J. Purke

[57] ABSTRACT

A method and apparatus for selecting a quantizer scale for each macroblock to maintain the overall quality of the video image while optimizing the coding rate. A quantizer scale is selected for each macroblock such that target bit rate for the picture is achieved while an optimal quantization scale ratio is maintained for successive macroblocks to produce a uniform visual quality over the entire picture. One embodiment applies the method to the frame level while another embodiment applies the method in conjunction with a wavelet transform.

23 Claims, 7 Drawing Sheets

APPARATUS AND METHOD FOR OPTIMIZING THE RATE CONTROL IN A CODING SYSTEM

This application claims the benefit of U.S. Provisional applications Ser. No. 60/007,014 filed Oct. 25, 1995, Ser. No. 60/007,016 filed Oct. 25, 1995 and Ser. No. 60/020,872 filed Jun. 28, 1996.

The present invention relates to an apparatus and concomitant method for optimizipg the coding of motion video. More particularly, this invention relates to a method and apparatus that recursively adjusts the quantizer scale for each macroblock to maintain the overall quality of the motion video while optimizing the coding rate.

BACKGROUND OF THE INVENTION

The increasing development of digital video technology presents an ever increasing problem of reducing the high cost of video compression codecs (coder/decoder) and resolving the inter-operability of equipment of different manufacturers. To achieve these goals, the Moving Picture Experts Group (MPEG) created the ISO/IEC international Standards 11172 (1991) (generally referred to as MPEG-1 format) and 13818 (1995) (generally referred to as MPEG-2 format), which are incorporated herein in their entirety by reference. One goal of these standards is to establish a standard coding/decoding strategy with sufficient flexibility to accommodate a plurality of different applications and services such as desktop video publishing, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms in areas such as image pre-processing, motion estimation, coding mode decisions, scalability, and rate control. This flexibility fosters development and implementation of different MPEG-specific algorithms, thereby resulting in product differentiation in the marketplace. However, a common goal of MPEG encoder designers is to minimize subjective distortion for a prescribed bit rate and operating delay constraint.

In the area of rate control, MPEG does not define a specific algorithm for controlling the bit rate of an encoder. It is the task of the encoder designer to devise a rate control process for controlling the bit rate such that the decoder input buffer neither overflows nor underflows. A fixed-rate channel is assumed to carry bits at a constant rate to an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the encoder to monitor the number of bits generated by the encoder, thereby preventing the overflow and underflow conditions.

Currently, one way of controlling the bit rate is to alter the quantization process, which will affect the distortion of the input video image. By altering the quantizer scale (step size), the bit rate can be changed and controlled. To illustrate, if the buffer is heading toward overflow, the quantizer scale should be increased. This action causes the quantization process to reduce additional Discrete Cosine Transform (DCT) coefficients to the value "zero", thereby reducing the number of bits necessary to code a macroblock. This, in effect, reduces the bit rate and should resolve a potential overflow condition. However, if this action is not sufficient to prevent an impending overflow then, as a last resort, the encoder may discard high frequency DCT coefficients and only transmit low frequency DCT coefficients. Although this drastic measure will not compromise the validity of the coded bitstream, it will produce visible artifacts in the decoded video image.

Conversely, if the buffer is heading toward underflow, the quantizer scale should be decreased. This action increases the number of non-zero quantized DCT coefficients, thereby increasing the number of bits necessary to code a macroblock. Thus, the increased bit rate should resolve a potential underflow condition. However, if this action is not sufficient, then the encoder may insert stuffing bits into the bitstream, or add leading zeros to the start codes. These stuffing bits will be removed by the decoder, but the decoded picture may possess blockiness which is due to coding the picture too coarsely with a large quantizer scale.

Although changing the quantizer scale is an effective method of implementing the rate control of an encoder, it has been shown that a poor rate control process will actually degrade the visual quality of the video image, i.e., failing to alter the quantizer scale in an efficient manner such that it is necessary to drastically alter the quantizer scale toward the end of a picture to avoid overflow and underflow conditions. Since altering the quantizer scale affects both image quality and compression efficiency, it is important for a rate control process to control the bit rate without sacrificing image quality.

A second method of implementing rate control is to set the quantizer scale to a constant for the entire picture of the video image. This method simplifies the rate control process at the expense of image quality. If the quantizer scale is set to a constant, the variance of the quantization noise is typically constant. The quantization noise is the difference between the actual value and the quantized value. Thus, if the quantizer scale is kept constant over a picture, then the total mean square error of the coded picture tends to be close to the minimum, for a given number of coding bits.

However, the human visual system (HVS) is more sensitive to certain quantization noise than others. Namely, not all spatial information is perceived alike by the human visual system and some macroblocks within a picture need to be coded more accurately than others. This is particularly true of macroblocks corresponding to very smooth gradients where a very slight inaccuracy will be perceived as a visible macroblock boundary (known as blocking effect). Thus, the visual appearance of most pictures can be improved by varying the quantizer scale over the entire picture, i.e., lowering the quantizer scale in smooth areas of the picture and increasing it in "busy" areas. This technique should reduce the visibility of blockiness in smooth areas at the expense of increasing the quantization noise in the busy area where the noise is hidden by the image detail.

In the current MPEG coding strategies (e.g., Test Models 4 and 5 (TM4 and TM5)), the quantizer scale for each macroblock is selected by assuming that all the pictures of the same type have identical complexity within a group of pictures. Namely, after a picture of a certain type (I, P, or B) is encoded, TM4 and TM5 use the result of the encoding to establish the complexity of each type of picture. Complexity is a measure of the amount of bits necessary to code the content of a picture at a particular quantizer scale. Thus, TM4 and TM5 use the estimated complexity to derive a bit budget (picture target bits) for each picture which, in turn, is used to select an appropriate quantizer scale to meet this bit budget. However, the quantizer scale selected by this criterion may not achieve optimal coding performance, since the complexity of each picture will vary with time.

Furthermore, encoders that utilize global-type transforms have similar problems. For example, one such global-type compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer incorporating zerotrees. The representation of signal data using a multiresolution hierarchical subband representation was disclosed by Burt et al. in IEEE Trans. on Commun., Vol Com-31, No. 4, April 1983, page 533. A wavelet pyramid, also known as critically sampled quadrature-mirror filter (QMF) subband representation, is a specific type of multi-resolution hierarchical subband representation of an image. A wavelet pyramid was disclosed by Pentland et al. in Proc. Data Compression Conference Apr. 8–11, 1991, Snowbird, Utah. A QMF subband pyramid has been described in "Subband Image Coding", J. W. Woods ed., Kluwer Academic Publishers, 1991 and I. Daubechies, *Ten Lectures on Wavelets*, Society for Industrial and Applied Mathematics (SIAM): Philadelphia, Pa., 1992.

Wavelet transforms, otherwise known as hierarchical subband decomposition, have recently been used for low bit rate image compression because such decomposition leads to a hierarchical multi-scale representation of the source image. Wavelet transforms are applied to an important aspect of low bit rate image coding: the coding of a binary map (a wavelet tree) indicating the locations of the non-zero values, otherwise known as the significance map of the transform coefficients. Using scalar quantization followed by entropy coding, in order to achieve very low bit rates, i.e., less than 1 bit/pel, the probability of the most likely symbol after quantization—the zero symbol—must be extremely high. Typically, a large fraction of the bit budget must be spent on encoding the significance map. It follows that a significant improvement in encoding the significance map (the wavelet tree) translates into a significant improvement in the compression of information preparatory to storage or transmission.

U.S. Pat. 5,412,741 issued May 2, 1995 and herein incorporated by reference discloses an apparatus and method for encoding information with a high degree of compression. The apparatus uses so-called zerotree coding of wavelet coefficients in a much more efficient manner than any previous techniques. The key to this apparatus is the dynamic generation of the list of coefficient indices to be scanned, whereby the dynamically generated list only contains coefficient indices for which a symbol must be encoded. This is a dramatic improvement over the prior art in which a static list of coefficient indices is used and each coefficient must be individually checked to see whether a) a symbol must be encoded, or b) it is completely predictable.

The apparatus uses a method for encoding information comprising the steps of forming a wavelet transform of the image, forming a zerotree map of the wavelet coefficients, encoding the significant coefficients on an initial dominant list from the coarsest level of the transform and the children of those coefficients whose indices are appended to the dominant list as the coefficient of the parent is found to be significant, reducing the threshold, refining the estimate of the value of the significant coefficients to increase the accuracy of the coded coefficients, and cycling back to scan the dominant list anew at the new, reduced threshold.

To accomplish the iterative process, the method of the prior art is accomplished by scanning the wavelet tree breadth first pattern, i.e., all parent nodes are coded, then all children, then all grandchildren and so on. As the process iterates through the wavelet tree representation of the image, this apparatus codes one of four symbols within the zerotree map.

The output bit stream from a video encoder tends to have a variable bit rate that fluctuates according to scene contents and the nature of the coding process used by the encoder. In practical applications for encoders, the communication channel through which the coded data is to be transmitted is generally a constant capacity channel. As such, the encoder requires a mechanism to regulate the output bit rate to match the channel rate with minimum loss of signal quality.

Heretofore, encoders that utilize global-type transforms such as wavelet transforms have special requirements that are not met by the prior are rate control techniques.

Therefore, a need exists in the art for an apparatus and method that recursively adjusts the quantizer scale for each macroblock to maintain the overall quality of the video image while optimizing the coding rate.

SUMMARY OF THE INVENTION

The present invention is a method and apparatus for selecting a quantizer scale for each macroblock to maintain the overall quality of the video image while optimizing the coding rate. Namely, a quantizer scale is selected for each macroblock such that target bit rate for the picture is achieved while an optimal quantization scale ratio is maintained for successive macroblocks to produce a uniform visual quality over the entire picture.

Specifically, the method initially obtains a rough estimate of the complexity of a specific type of picture (I, P, B) from previously encoded pictures or by implementing the TM4 and TM5 methods. The estimated complexity is used to calculate a predicted number of bits necessary to code each macroblock. With this knowledge, a quantizer scale is calculated for the macroblock in accordance with a complexity model having a polynomial form.

The quantizer scale is further refined by a modifier which is derived from a constraint that requires a constant visual quality to be maintained for the entire picture. Namely, an optimal quantization scale ratio is maintained for successive macroblocks. The method applies the modifier to the quantizer scale to produce an optimal quantizer scale which is used to code the macroblock.

Once the macroblock is encoded, the method recursively modifies the complexity model through the use of a regression process. That is, the actual number of bits necessary to code the macroblock is used to refine the complexity model so as to improve the prediction of a quantizer scale for the next macroblock. This process is continued until the entire picture is encoded. Thus, the method recursively adjusts the complexity model for controlling the bit rate of the encoder while simultaneously maintaining the overall quality of the video image.

In a second embodiment, a rate control method uses the actual distortion data resulting from the encoding process to directly compute the quantizer scale for the next macroblock.

In a third embodiment, a rate control method is applied to predict a number of bits for a frame using coding information from a previous frame or picture.

In a fourth embodiment, the present invention is applied to control the output bit rate of a wavelet-based video encoder by controlling the coding rate of the wavelet coefficients.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
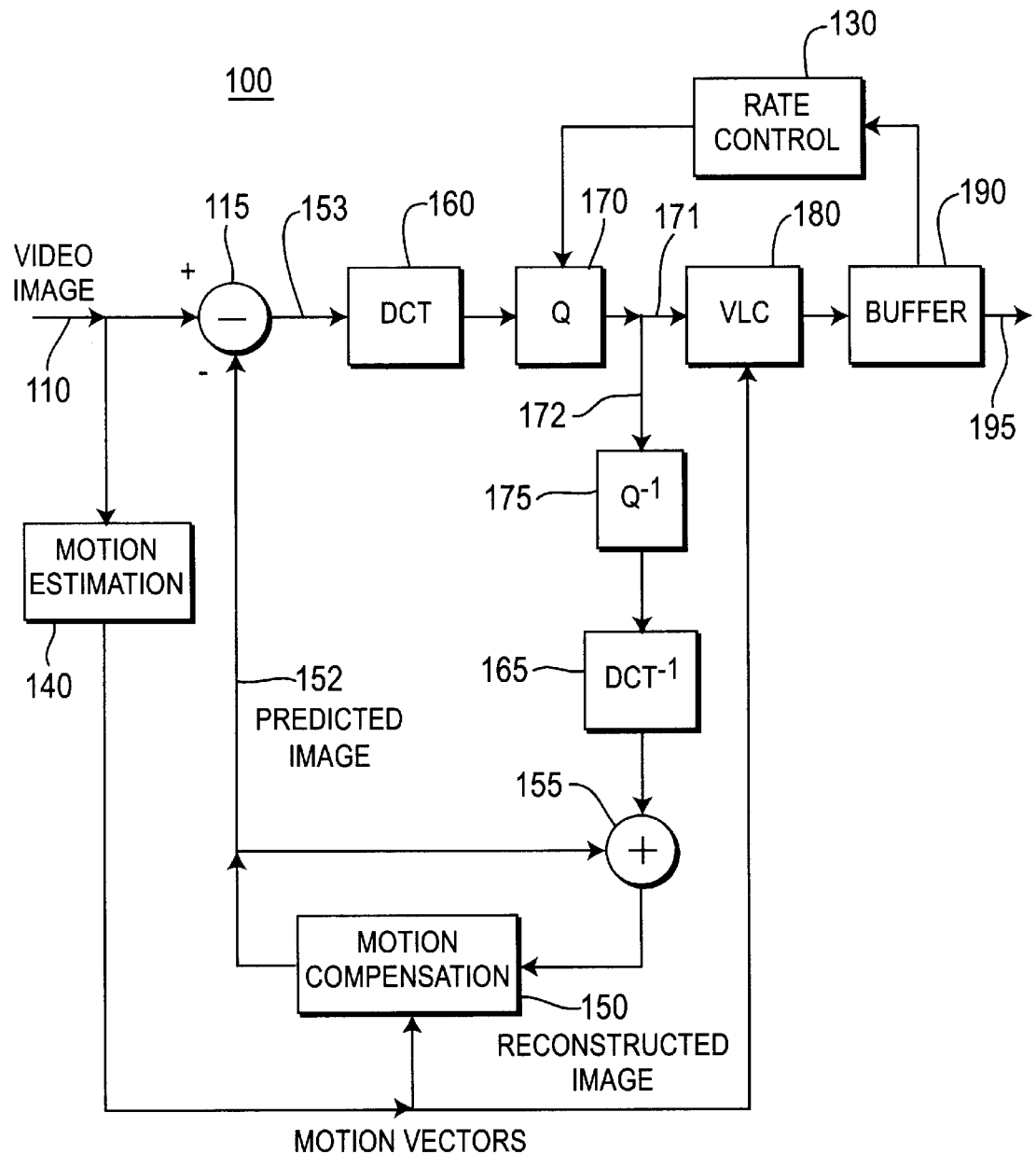
FIG. 1 illustrates a block diagram of the apparatus of the present invention.

FIG. 1 depicts a block diagram of the apparatus 100 of the present invention for deriving a quantizer scale for each macroblock to maintain the overall quality of the video image while controlling the coding rate. In the preferred embodiment of the present invention, the apparatus 100 is an encoder or a portion of a more complex block-based motion compensation coding system. The apparatus 100 comprises a motion estimation module 140, a motion compensation module 150, a rate control module 130, a DCT module 160, a quantization (Q) module 170, a variable length coding (VLC) module 180, a buffer 190, an inverse quantization ($Q^{-1}$) module 175, an inverse DCT ($DCT^{-1}$) transform module 165, a subtractor 115 and a summer 155. Although the apparatus 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) 110 which is digitized and represented as a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image on path 110 is received into motion estimation module 140 for estimating motion vectors. A motion vector is a two-dimensional vector which is used by motion compensation to provide an offset from the coordinate position of a block in the current picture to the coordinates in a reference frame. Because of the high redundancy that exists between the consecutive frames of a video image sequence, a current frame can be reconstructed from a reference frame and the difference between the current and reference frames by using the motion information (motion vectors). The reference frames can be a previous frame (P-frame), or previous and/or future frames (B-frames). The use of motion vectors greatly enhances image compression by reducing the amount of information that is transmitted on a channel because only the changes between the current and reference frames are coded and transmitted. Various methods are currently available to an encoder designer for implementing motion estimation.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Furthermore, prior to performing motion compensation prediction for a given macroblock, a coding mode must be selected. In the area of coding mode decision, MPEG provides a plurality of different macroblock coding modes. Generally, these coding modes are grouped into two broad classifications, inter mode coding and intra mode coding. Intra mode coding involves the coding of a macroblock or picture that uses information only from that macroblock or picture. Conversely, inter mode coding involves the coding of a macroblock or picture that uses information both from itself and from macroblocks and pictures occurring at different times. Specifically, MPEG-2 provides macroblock coding modes which include intra mode, no motion compensation mode (No MC), frame/field/dual-prime motion compensation inter mode, forward/backward/average inter mode and field/frame DCT mode. The proper selection of a coding mode for each macroblock will improve coding performance. Again, various methods are currently available to an encoder designer for implementing coding mode decision.

Once a coding mode is selected, motion compensation module 150 generates a motion compensated prediction (predicted image) on path 152 of the contents of the block based on past and/or future reference pictures. This motion compensated prediction on path 152 is subtracted via subtractor 115 from the video image on path 110 in the current macroblock to form an error signal or predictive residual signal on path 153. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, predictive residual signal on path 153 is passed to the DCT module 160 for encoding.

The DCT module 160 then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions. One advantage of the discrete cosine transform is that the DCT coefficients are uncorrelated. This decorrelation of the DCT coefficients is important for compression, because each coefficient can be treated independently without the loss of compression efficiency. Furthermore, the DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video image. The proper selection of a quantizer scale is performed by the rate control module 130.

Next, the resulting 8×8 block of quantized DCT coefficients is received by variable length coding module 180 via signal connection 171, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Since quantization generally reduces DCT coefficients of high spatial frequencies to zero, the one-dimensional string of quantized DCT coefficients is typically represented by several integers followed by a string of zeros.

Variable length coding (VLC) module 180 then encodes the string of quantized DCT coefficients and all side-information for the macroblock such as macroblock type and motion vectors. The VLC module 180 utilizes variable length coding and run-length coding to efficiently improve coding efficiency. Variable length coding is a reversible coding process where shorter code-words are assigned to frequent events and longer code-words are assigned to less frequent events, while run-length coding increases coding efficiency by encoding a run of symbols with a single symbol. These coding schemes are well known in the art and are often referred to as Huffman coding when integer-length code words are used. Thus, the VLC module 180 performs the final step of converting the input video image into a valid data stream. Those skilled in the art will realize that the VLC module can be replaced with other types of entropy coders.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 is a compressed representation of the input video image on path 110, where it is sent to a storage medium or telecommunication channel via path 295.

The rate control module 130 serves to monitor and adjust the bit rate of the data stream entering the FIFO buffer 190 to prevent overflow and underflow on the decoder side (within a receiver or target storage device, not shown) after transmission of the data stream. Thus, it is the task of the rate control module 130 to monitor the status of buffer 190 to control the number of bits generated by the encoder.

In the preferred embodiment of the present invention, rate control module 130 selects a quantizer scale for each macroblock to maintain the overall quality of the video image while controlling the coding rate. Namely, a quantizer scale is selected for each macroblock such that target bit rate for the picture is achieved while an optimal quantization scale ratio is maintained for successive macroblocks to produce a uniform visual quality over the entire picture.

Specifically, the rate control module 130 initially obtains a rough estimate of the complexity of a specific type of picture (I, P, B) from previously encoded pictures or by implementing the TM4 and TM5 methods. This estimated complexity is used to derive a predicted number of bits necessary to code each macroblock. With this knowledge, a quantizer scale is calculated for the macroblock in accordance with a complexity model having a polynomial form. This complexity model is derived to meet the constraint that the selected quantizer scales for the macroblocks should approach the target bit rate for the picture.

Furthermore, the quantizer scale is optionally refined by a modifier which is derived to meet a constraint that requires a constant visual quality to be maintained for the entire picture. Namely, the constraint requires an optimal quantization scale ratio to be maintained for successive macroblocks. The rate control module applies the modifier to the quantizer scale to produce an optimal quantizer scale which is used to code the macroblock. Once the macroblock is encoded, the rate control module recursively adjusts the complexity model through the use of a polynomial regression process. That is, the actual number of bits necessary to code the macroblock is used to refine the complexity model so as to improve the prediction of a quantizer scale for the next macroblock. A detailed description of the quantizer scale selection method is discussed below with reference to FIG. 2 and FIG. 3.

Returning to FIG. 1, the resulting 8×8 block of quantized DCT coefficients from the quantization module 170 is also received by the inverse quantization module 175 via signal connection 172. At this stage, the encoder regenerates I-frames and P-frames of the input video image by decoding the data so that they are used as reference frames for subsequent encoding. The inverse quantization module 175 starts the decoding process by dequantizing the quantized DCT coefficients. Namely, the quantized DCT coefficients are multiplied by a set of quantization values with appropriate rounding to produce integer values.

The resulting dequantized 8×8 block of DCT coefficients are passed to the inverse DCT module 165 where inverse DCT is applied to each macroblock to produce the decoded error signal. This error signal is added back to the prediction signal from the motion compensation module via summer 155 to produce a decoded reference picture (reconstructed image). Generally, if an I-frame or a P-frame is decoded, it will be stored, replacing the oldest stored reference. Thus, an apparatus 100 for selecting a quantizer scale for each macroblock to maintain the overall quality of the video image while optimizing the coding rate is disclosed.

Figure 2:
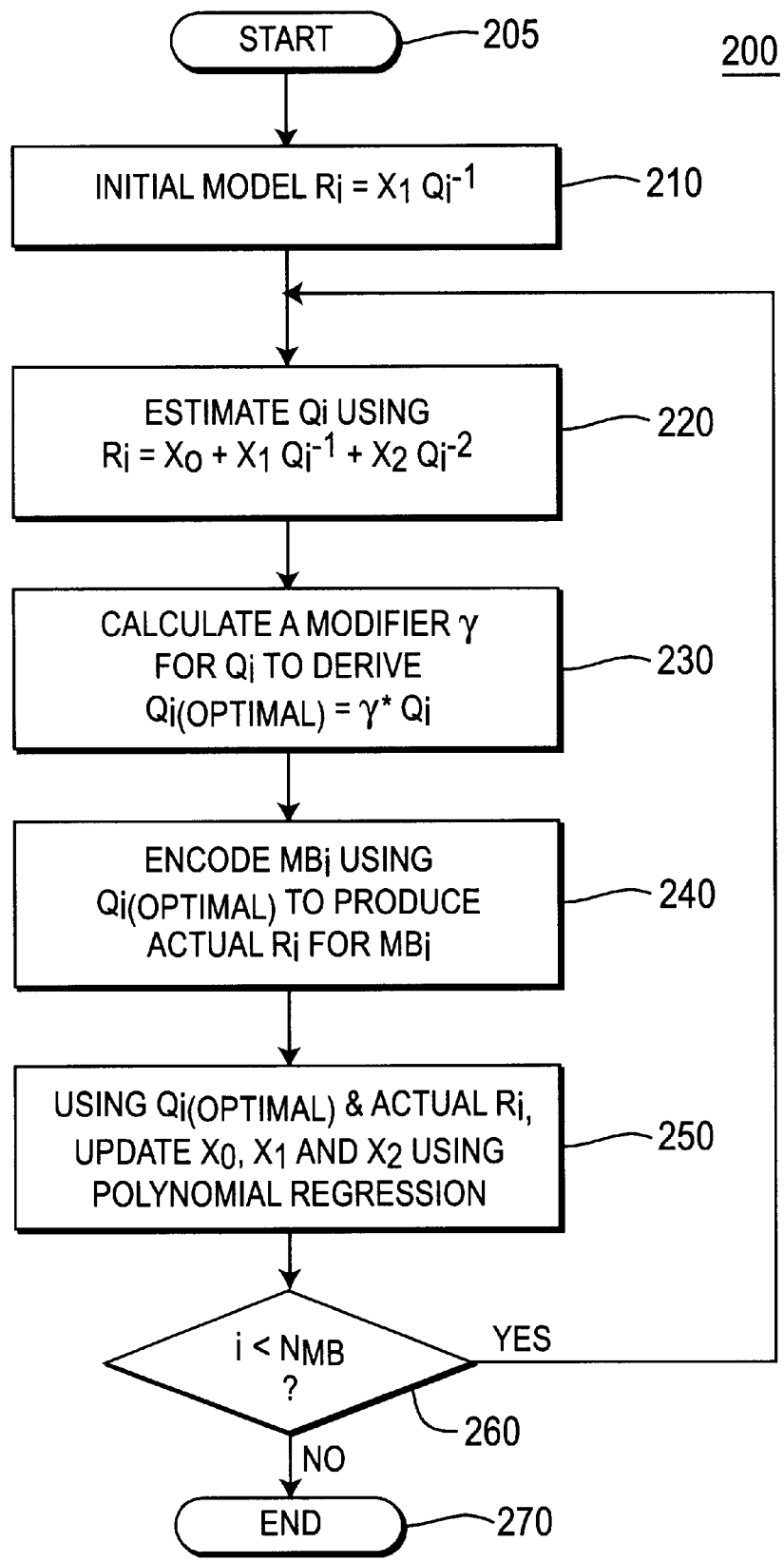
FIG. 2 illustrates a flowchart for deriving the optimal quantizer scale in accordance with a complexity model for controlling the bit rate of the apparatus.

FIG. 2 depicts a flowchart for deriving the optimal quantizer scale in accordance with a complexity model for controlling the bit rate of the apparatus in the preferred embodiment of the present invention. To develop the preferred embodiment of the present invention, an optimization problem was formulated for the selection of the quantizer scale. The solution is based upon the rate-distortion characteristics or R(D) curves for all the macroblocks that compose the picture being coded. Based upon the results, a method for selecting the quantizer scale for each macroblock with less complexity for practical implementation is presented.

The first constraint for the optimal solution is:

$$T = \sum_{i=1}^{N} R_i \quad (1)$$

which states that the target bit rate for a picture, T, is measured as an accumulation of the bits allocated to individual macroblock, $R_i$, for all N, the total number of macroblocks in the picture.

The second constraint for the optimal solution is:

$$Q_1 \times k_1 = \ldots = Q_N \times k_n \quad (2)$$

which states that the product for the macroblock i of the quantizer scale, $Q_i$, and a human visual system weighting, $k_i$, should be equal to the product of Q and k for any other macroblock on the picture to maintain a constant visual quality. In effect, there exists a set of optimal quantization scale ratios $k_i \ldots k_{N-1}$ so that the whole picture has equal overall quality which can be alternatively expressed as:

$$\frac{Q_2}{Q_1} = \frac{k_1}{k_2} = \ldots = k'_i \ldots k'_{N-1} \quad (3)$$

where $k_i = k_1/k_2, \ldots, k_{N-1} = k_{N-1}/k_N$.

The third constraint for the optimal solution is:

$$Q_i \times R_i = X_i(v_i) \quad (4)$$

which states that the complexity measure, $X_i$, for the macroblock i is a function of a metric $v_i$ or is described in terms of the product of the bit rate and quantizer scale of the macroblock i. This functional relationship is also implicitly assumed at the picture layer and the slice layer. In the preferred embodiment, the metric $v_i$ is the variance computed over the pixels in the macroblock i.

The method 200 of the present invention as depicted in FIG. 2 is formulated to derive a quantizer scale for each macroblock which will meet the above constraints. The solution should reach the target bit rate while maintaining the relative ratios of all the quantizer scales so that the visual quality is uniform within one picture or frame.

Referring to FIG. 2, the method begins at step 205 and proceeds to step 210 where the method adopts an initial model having the relationship of $R_i = X_i Q_i^{-1}$ (equation 4) to predict $R_1$, the bits allocated to code the current macroblock i. This initial model acquires an initial prediction of the complexity $X_I$, $X_P$ and $X_B$ for each type of picture I, P and B respectively through actual encoding of prior pictures or other methods such as TM4 and TM5. The complexity for each type of picture is derived from the number of bits generated by encoding each picture and an average of the quantizer scales used to code the macroblocks in the picture. Since the initial model assumes that pictures of similar type will possess similar complexity, then $R_i$ can be quickly predicted in step 210 for the current macroblock from the previously encoded picture. The predicted $R_i$ for the current macroblock is passed to step 220 to calculate for an appropriate quantizer scale.

In step 220, the method uses a more accurate complexity model to calculate the quantizer scale which is expressed as:

$$R_i = X_0 + \frac{X_1}{Q_i} + \frac{X_2}{Q_i^2} \quad (5)$$

where $R_i$ is the bits allocated to the macroblock i, $Q_i$ is the quantizer scale of the macroblock i and $X_0$, $X_1$ and $X_2$ are constants. At the beginning of the coding process, the constants $X_0$ and $X_2$ are set to zero. This effectively reduces equation 5 to the initial model of equation 4. Since there is insufficient data at this early stage of the coding process, equation 4 is used to acquire a rough estimate of the quantizer scale for the current macroblock. Namely, the selected quantizer scale should be suitably an average of the quantizer scales used to code the macroblocks in the previous picture.

In step 230, the method calculates a modifier, γ, based on a constraint that a set of optimal quantization scale ratios be maintained. This modifier is multiplied to the quantizer scale to produce an optimal quantizer scale, $Q_{i(optimal)}$, such that a constant visual quality is maintained throughout the entire picture. The method of generating the modifier is discussed in detail below with reference to FIG. 3.

In step 240, the method encodes the macroblock i by using the optimal quantizer scale calculated from step 230. The encoding method produces the actual number of bits needed to encode the macroblock i which is passed to step 250.

In step 250, the method uses the optimal quantizer scale used to code the macroblock i and the actual number of bits needed to encode the macroblock i in a polynomial regression model or a quadratic regression model to refine the complexity model of step 220. Namely, the constants $X_0$, $X_1$ and $X_2$ are updated to account for the discrepancy between the bits allocated to the macroblock i and the actual number of bits needed to the code the macroblock for a particular quantizer scale. Regression models are well known in the art. For a detailed discussion of various regression models, see e.g., Bowerman and O'Connell, *Forecasting and Time Series*, 3rd Edition, Duxbury Press, (1993, chapter 4).

In step 260, method 200 queries whether there are additional macroblocks that remain to be coded in the current picture. If the query is affirmatively answered, method 200 returns to step 220 to calculate a new quantizer scale for the next macroblock with the updated constants $X_0$, $X_1$ and $X_2$. If the query is negatively answered, method 200 proceeds to code the next picture or end.

Figure 3:
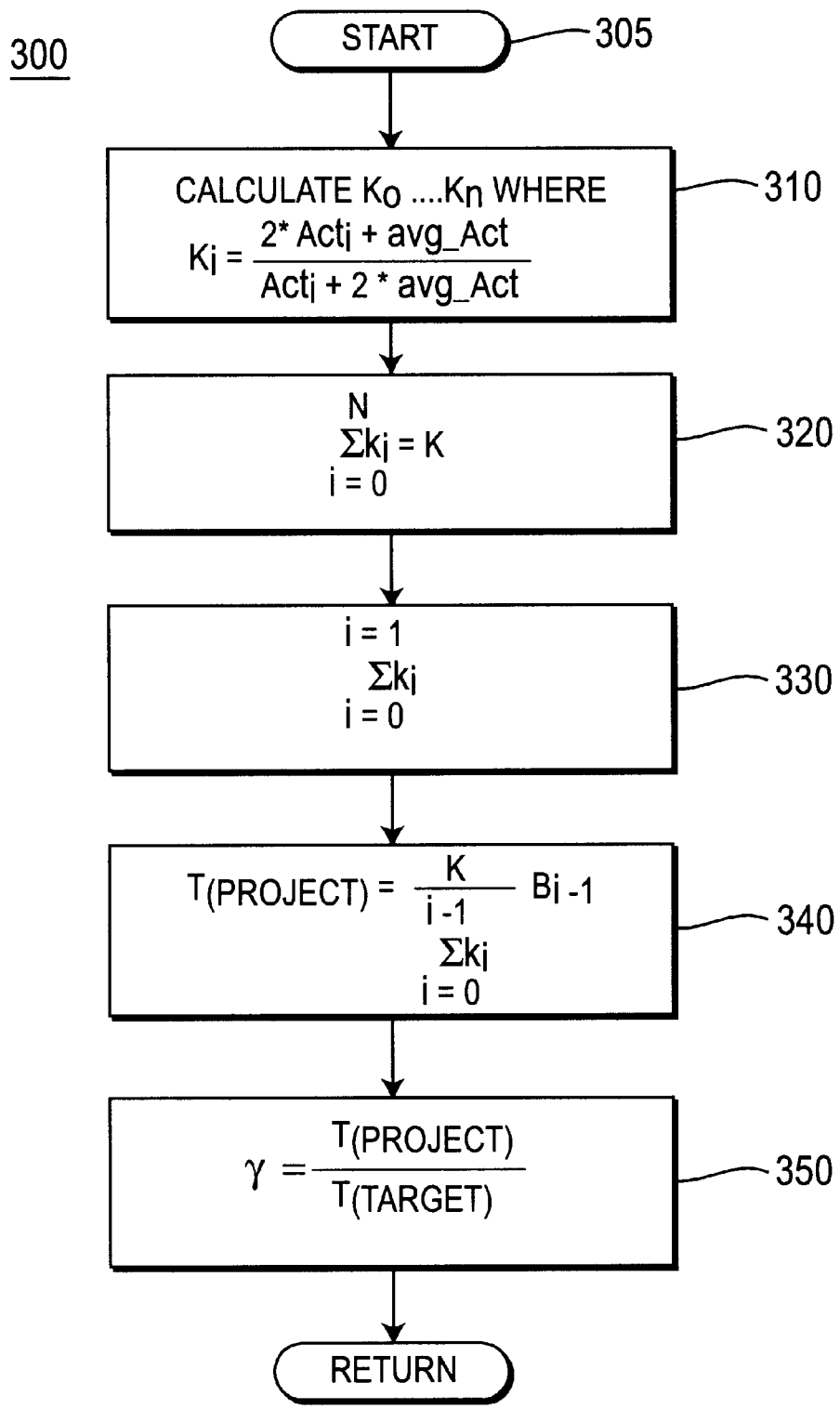
FIG. 3 illustrates a flowchart for deriving a modifier to the quantizer scale based upon the constraint of an optimal quantization ratio.

FIG. 3 illustrates a method 300 (step 230 of FIG. 2) for deriving a modifier to the quantizer scale based upon the constraint of an optimal quantization ratio. The method begins at step 305 and proceeds to step 310, where the method calculates a set of human visual system weighting, $k_i$ . . . $k_N$ in accordance with the formula:

$$k_i = \frac{2 * \text{Act}_i + \text{avg\_Act}}{\text{Act}_i + 2 * \text{avg\_Act}} \quad i = 0, 1, 2, \ldots, N. \quad (6)$$

and $$\text{Act}_i = 1 + \min(\text{Var\_sblk}) \quad (7)$$

where $\text{Act}_i$, is a spatial activity measure for the macroblock i. $\text{Act}_i$ is computed by using the original pixel values from the smallest of the four (4) luminance frame-organized sub-blocks and the four (4) luminance field-organized sub-blocks. Var_sblk is expressed as:

$$\text{Var\_sblk} = \frac{1}{64} \sum_{k=1}^{64} (P_k - P\_\text{mean})^2 \quad (8)$$

and $$P\_\text{mean} = \frac{1}{64} \sum_{k=1}^{64} P_k \quad (9)$$

where $P_k$ are the original pixel values in the original 8×8 sub-block.

In the preferred embodiment of step 310, the metric used to calculate the set of human visual system weightings is the variance computed over the pixels in the macroblock i. The set of human visual system weighting for all macroblocks for a picture is calculated prior to encoding.

In step 320, the method sums the set of human visual system weightings to derive a measure, K, which represents the total human visual system weighting for a picture. Thus, K is expressed as:

$$\sum_{i=0}^{N} k_i = K \quad (10)$$

In step 330, the method obtains a sum of all the human visual system weightings up to $k_{i-1}$ which is represented as:

$$\sum_{i=0}^{i-1} k_i \quad (11)$$

In effect, this step computes the sum of all the human visual system weightings up to the previous macroblock i-1.

In step 340, the projected number of bits $T_p$ for the whole picture is computed by:

$$T_P = \frac{K}{\sum_{i=o}^{i-1} k_i} B_{i-1} \quad (12)$$

where $B_{i-1}$ is the sum of all the bits used to code the current frame up to and including the previous macroblock i-1.

In step 350, the method calculates a modifier or bit activity index ratio, γ, by dividing the projected number of bits, $T_p$ by the target number of bits for the picture T which is expressed as:

$$\gamma = \frac{T_P}{T} \quad (13)$$

This modifier is multiplied to the quantizer scale, $Q_i$ calculated in step 220 to produce a $Q_{i(optimal)}$ such that a constant visual quality is maintained.

In the preferred embodiment of the present invention, the complexity model depicted in step 220 is a second order polynomial. However, a simulation on a flower garden sequence was conducted to compare the performance of a linear complexity model, a second order polynomial complexity model and a third order polynomial complexity model. In determining the performance of these three methods, a comparison was made of the fit of the model over the actual data, i.e., a calculation of the root mean square error was calculated and compared. The results are displayed in Table 1 below.

TABLE 1

|  | Linear Complexity Model | 2nd Order Polynomial Complexity Model | 3rd Order Polynomial Complexity Model |
| --- | --- | --- | --- |
| Root Mean Square Error | 91,702.31 | 26,362.81 | 21,517.72 |
| Improvement in % versus the Linear Complexity Model |  | 71.25% | 76.54% |

The results demonstrate that the 2nd order polynomial complexity model produces an improvement of over 71% over the linear model in predicting the complexity of a picture, thereby improving the overall rate control of an encoder. Furthermore, the results demonstrate that the 3rd order polynomial complexity model produces an improvement of over 76% when compared to the linear model. Although the 3rd order polynomial complexity model produced a better prediction, it also carries a higher computational overhead. Thus, an encoder designer must balance between prediction performance and computational overhead in selecting an appropriate complexity model. In the preferred embodiment, the 2nd order polynomial complexity model provides an accurate prediction with a moderate computational overhead. Furthermore, if computational overhead is an important constraint for a particular application, then step 230 as depicted in FIG. 3 can be omitted to simplify the rate control process.

In a second embodiment of the present invention, the actual data resulting from the encoding process is used directly to compute the quantizer scale for the next macroblock. This optimization process is formulated from the following equation:

$$R(D)=F(D)+\lambda*E \tag{14}$$

where R(D) is the total number of bits used to code the picture, F(D) is the rate distortion function of the current block, E is the target number of bits to be used in this picture and $\lambda$ is the Lagrange multiplier. In effect, the Lagrange multiplier process is applied to minimize the rate distortion function F(D) subject to the constraint of a target bit allocation E for a picture. This optimization process is discussed below with reference to FIG. 4.

Figure 4:
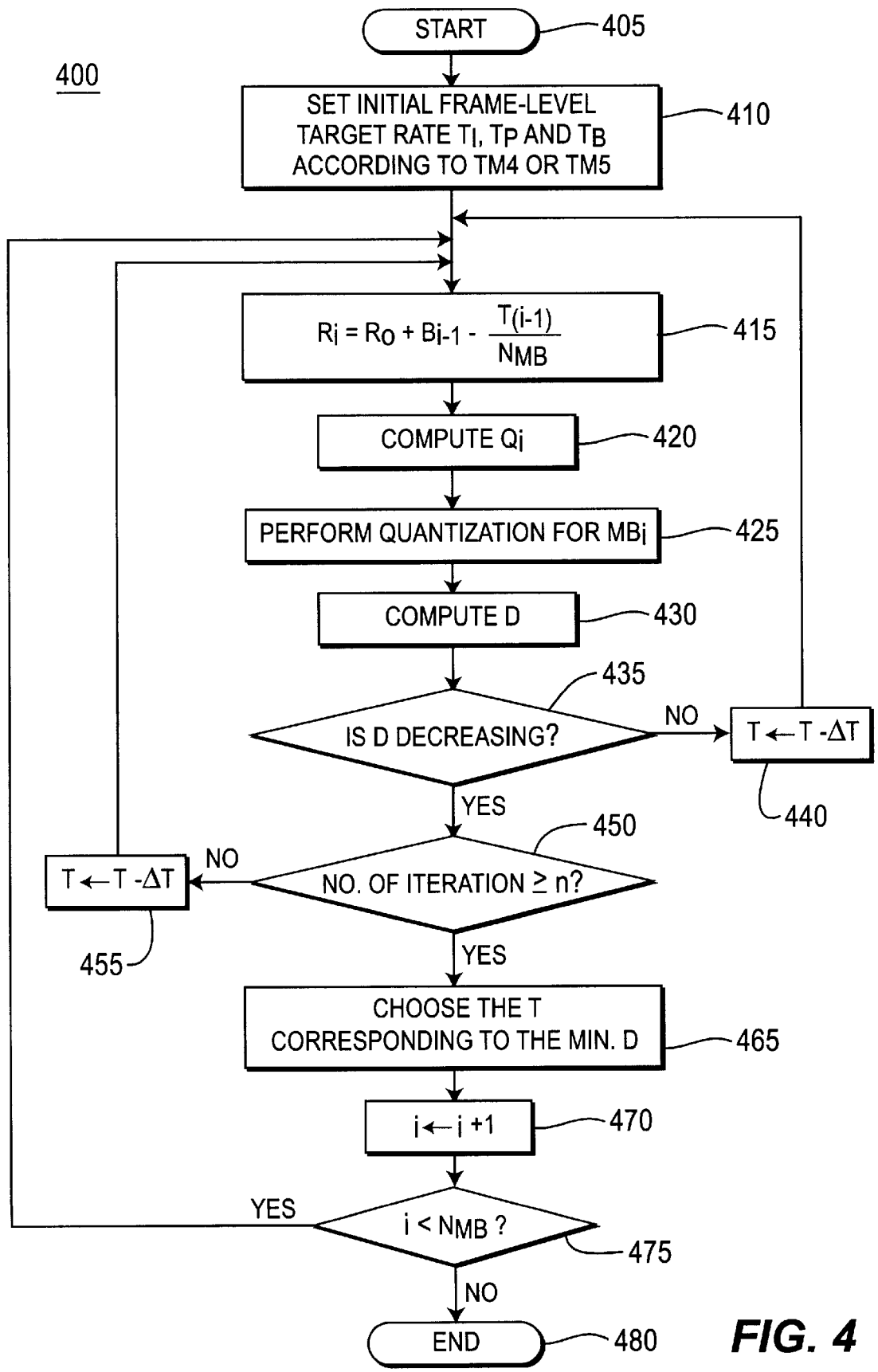
FIG. 4 illustrates a flowchart for a rate control method that uses the actual data resulting from the encoding process to directly compute the quantizer scale for the next macroblock.

FIG. 4 depicts a flowchart for a rate control method 400 that uses the actual data resulting from the encoding process to directly compute the quantizer scale for the next macroblock. The method begins at step 405 and proceeds to step 410 where the method adopts an initial model such as TM4 or TM5 to calculate the target bit rate $T_I$, $T_P$, and $T_B$ for an I frame, P frame and B frame respectively. An alternative model is to simply assign the target bit rate $T_I$, $T_P$, and $T_B$ from the actual number of bits necessary to encode previous I, P and B frames.

The method 400 computes, at step 415, a buffer fullness measure for each macroblock in the frame as:

$$R_i = R_0 + B_{i-1} - \frac{T*(i-1)}{N_{MB}} \tag{15}$$

where:

$R_i$ is the buffer fullness measure before encoding the i-th macroblock;

$R_0$ is the initial buffer fullness measure;

$B_{i-1}$ is the number of bits generated by encoding all macroblocks up to and including the i-1 macroblocks;

T is the target bit budget for an I, P or B frame in the previous I, P or B frame; and $N_{MB}$ is the total number of macroblocks in the present frame.

The buffer fullness measure $R_i$ is an indicator as to the amount of the output buffer that is presently filled with coded bits. This measure ensures that the encoder will not underflow or overflow the buffer and, as a result, lose data. Thus, the method establishes a quantizer scale that varies depending upon the fullness of the output buffer.

The method then computes, at step 420, the quantizer scale $Q_i$ for the i-th macroblock as:

$$Q_i = R_i \cdot \frac{31}{r} \tag{16}$$

$$r = 2 \cdot \frac{\text{bit rate}}{\text{frame rate}} \tag{17}$$

In step 425, the method encodes the i macroblock $MB_i$ with the quantizer scale calculated for the macroblock from step 420. The resulting encoded signal for the macroblock is passed to step 430.

In step 430, the method calculates the distortion D for the macroblock from the encoded signal. The distortion D is the actual distortion between the corresponding original macroblock of the input picture and the quantized macroblock. The calculated distortion is passed to step 435 for comparison.

In step 435, the method queries whether the distortion has decreased as compared from a previous calculation. Initially, D is set at zero, such that the first query always produces a negative response. If the query is negatively answered, the method proceeds to step 440 where T is replaced with T-$\Delta$T where $\Delta$T is expressed as:

$$\Delta T = 0.05 \frac{T}{N_{MB}} \tag{18}$$

The method then returns to step 415 to repeat the process of selecting a quantizer scale and encoding the macroblock. If the query is positively answered, the method proceeds to step 450. In effect, the method has determined from the actual data that the distortion is decreasing as T is adjusted.

In step 450, the method queries whether the predefined number of iterations of adjusting T has been performed. If the query is negatively answered, the method proceeds to step 455 where T is again replaced with T-$\Delta$T in accordance with equation 18. The method then repeats until the predefined number of iterations has been satisfied. If the query is positively answered, the method proceeds to step 465. In the preferred embodiment, T is adjusted twenty (20) times. However, the number of iterations can be adjusted to accommodate other factors such as speed, computational overhead and distortion.

In step 465, the method selects the T that produces the smallest distortion. This T will be used in step 415 for the next macroblock.

In step 470, the method increments i by one. In step 475, the method queries whether there are additional macroblocks. If the query is positively answered, the method proceeds to step 415 and the whole method is repeated for the next macroblock. If the query is negatively answered, the method proceeds to step 480 where the method will end or proceed to the next picture or frame.

In a third embodiment, the projected number of bits $T_P$ as disclosed in step 340 of FIG. 3 can be calculated using the coding information of the previous frame or picture. More specifically, since successive frames are often closely correlated, the number of bits used to code the previous frame is used to derive the projected number of bits $T_P(n)$ for the n frame.

Figure 5:
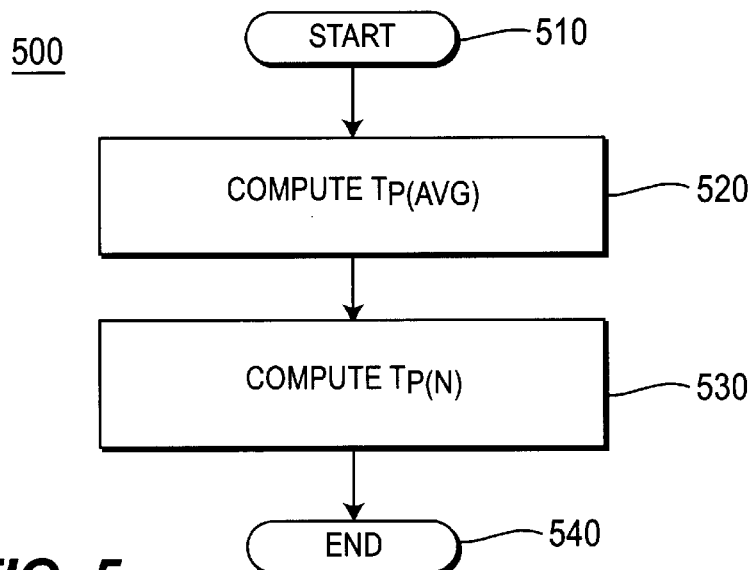
FIG. 5 illustrates a flowchart for calculating the projected number of bits $T_P(n)$ for the n frame.

FIG. 5 illustrates a flowchart of a method 500 for calculating the projected number of bits $T_P(n)$ for the n frame in accordance with the number of bits used to code the previous frame and the overall bit rate of a channel (or the bit budget for a group of pictures (GOP)). Although method 500 can be applied to all picture types, it is specifically well suited for predicting the number of bits for a P picture. However, those skilled in the art will realized that method 500 can be adjusted to improve the prediction of I and B pictures.

Referring to FIG. 5, the method 500 begins at step 510 and proceeds to step 520 where method 500 computes $T_{P(AVG)}$, where $T_{P(AVG)}$ is expressed as:

$$T_{P(AVG)} = \text{Max}(\text{bitrate/frame rate}, R/N) \quad (19)$$

where $T_{P(AVG)}$ is the projected average number of bits needed to code a remaining frame, R is the remaining number of bits and N is the remaining number of frames. Namely, in step 520, method 500 derives the projected average number of bits needed to code a remaining frame by selecting the greater of the division of the channel bitrate by the frame rate or the division of the remaining number of bits in a GOP (the remainder of the bit budget for a GOP) by the remaining number of frames in the GOP. Equation (19) permits method 500 to account for a change in the channel bitrate which will significantly affect the bit budget for a frame. Finally, the frame rate is generally set at 30 frames per second.

However, the calculation of $T_{P(AVG)}$ does not account for the close correlation of the content in successive frames. Namely, it is content independent and distributes the available bits equally to the remaining frames.

In step 530, method 500 computes the projected number of bits $T_P(n)$ for the n frame from the $T_{P(AVG)}$, where $T_P(n)$ is expressed as:

$$T_P(n) = T_{P(AVG)} * (1-w) + B(n-1) * w \quad (20)$$

where B(n-1) is the number of bits used to code the previous frame and w is a weighing factor which is set at 0.05. Thus, the projected number of bits $T_P(n)$ for the n frame comprises a component which accounts for the number of bits used to code the previous frame, thereby improving the projection for the number of bits needed to code a frame. In turn, $T_P(n)$ can be used as discussed above in FIGS. 2–4 to alter the quantizer scale to effect an efficient rate control. Finally, method 500 ends in step 540.

Furthermore, those skilled the art will realize that method 500 can be implemented by evaluating the number of bits spent versus the number of bits remaining. In addition, the weighing factor w can be adjusted to other values to accommodate other applications or adjusted in response to the content within the GOP.

Finally, Appendix A is enclosed to demonstrate the effectiveness of the rate control method illustrated in method 500 as compared with the proposed verification models (VMs) of the upcoming MPEG 4 standard.

Figure 6:
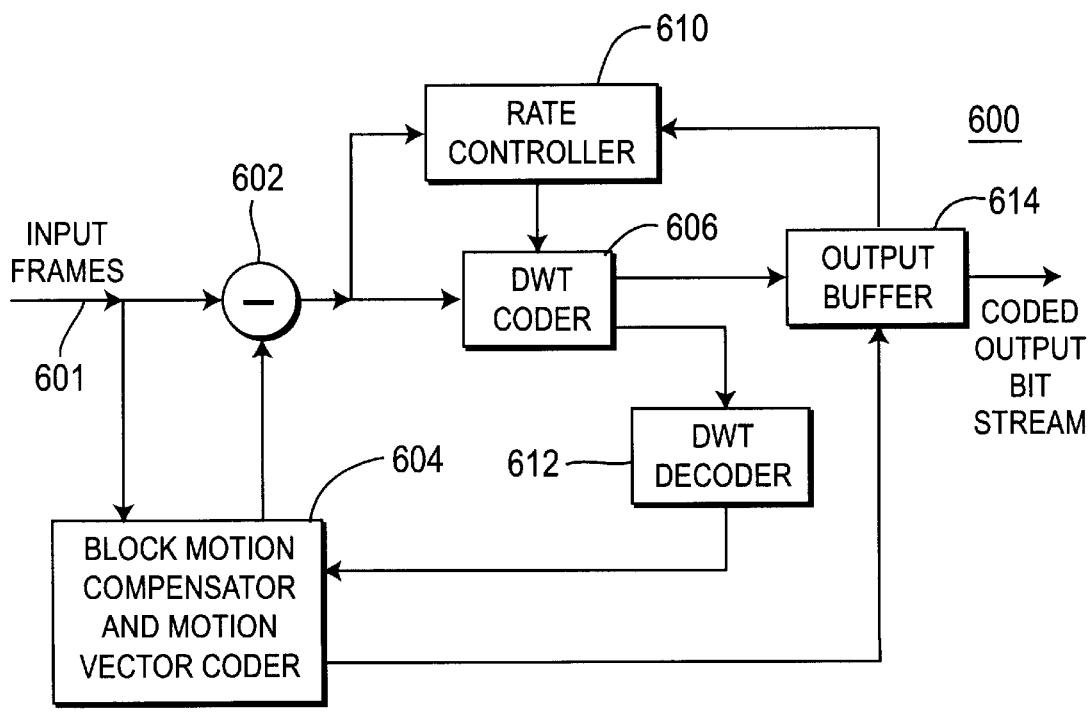
FIG. 6 depicts a block diagram of a wavelet-based encoder incorporating the present invention.

FIG. 6 depicts an encoder 600 that incorporates a fourth embodiment of the present invention. The encoder contains a block motion compensator (BMC) and motion vector coder 604, subtractor 602, discrete cosine transform (DWT) coder 606, bit rate controller 610, DWT decoder 612 and output buffer 614.

In general, the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 604, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver. Within the receiver, a decoder reconstructs each video frame using the coded residuals and motion vectors. A wavelet-based video encoder having the general structure of that depicted in FIG. 6 is disclosed in U.S. provisional patent application Ser. No. 60/007,012, filed Oct. 25, 1995, (converted into U.S. patent application Ser. No. 08/736,114, filed Oct. 24, 1996, and U.S. provisional patent application Ser. No. 60/007,013, filed Oct. 25, 1995, (converted into U.S. patent application Ser. No. 08/735,871, filed Oct. 23, 1996 now U.S. Pat. No. 5,764,805, both of which are incorporated herein by reference. Both these applications discuss the use of wavelet transforms to encode video signals.

This disclosure focuses on a technique for controlling the coding rate of the wavelet encoder. The general function of the encoder to produce wavelets from video sequences does not form any part of this invention and is only depicted in FIG. 6 and discussed below to place the invention within a practical context.

Figure 7:
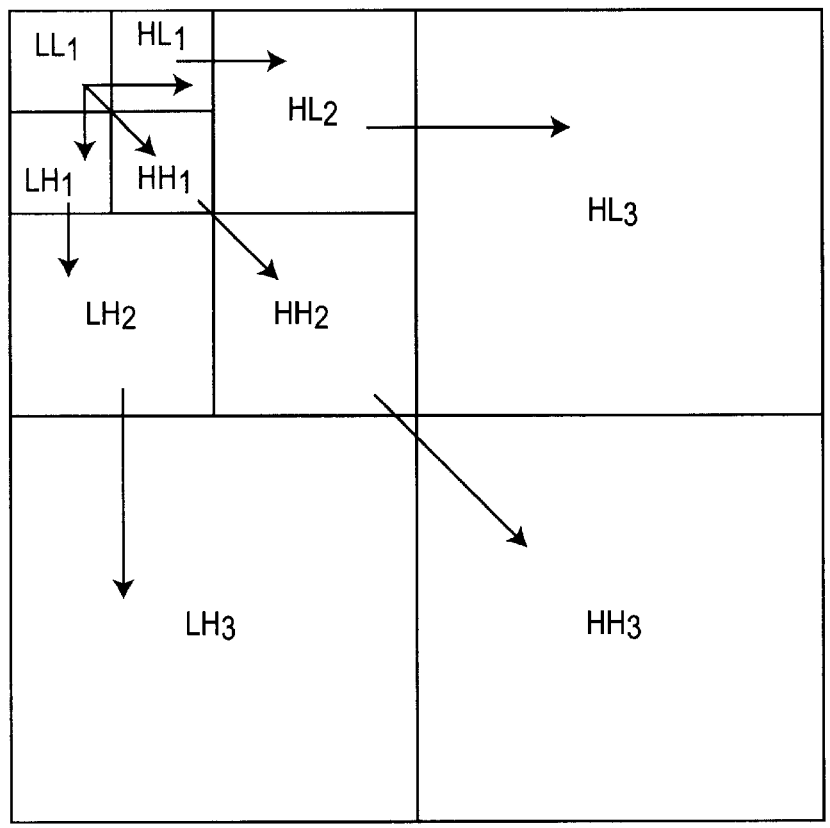
FIG. 7 is a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 7 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 6 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up).

Figure 8:
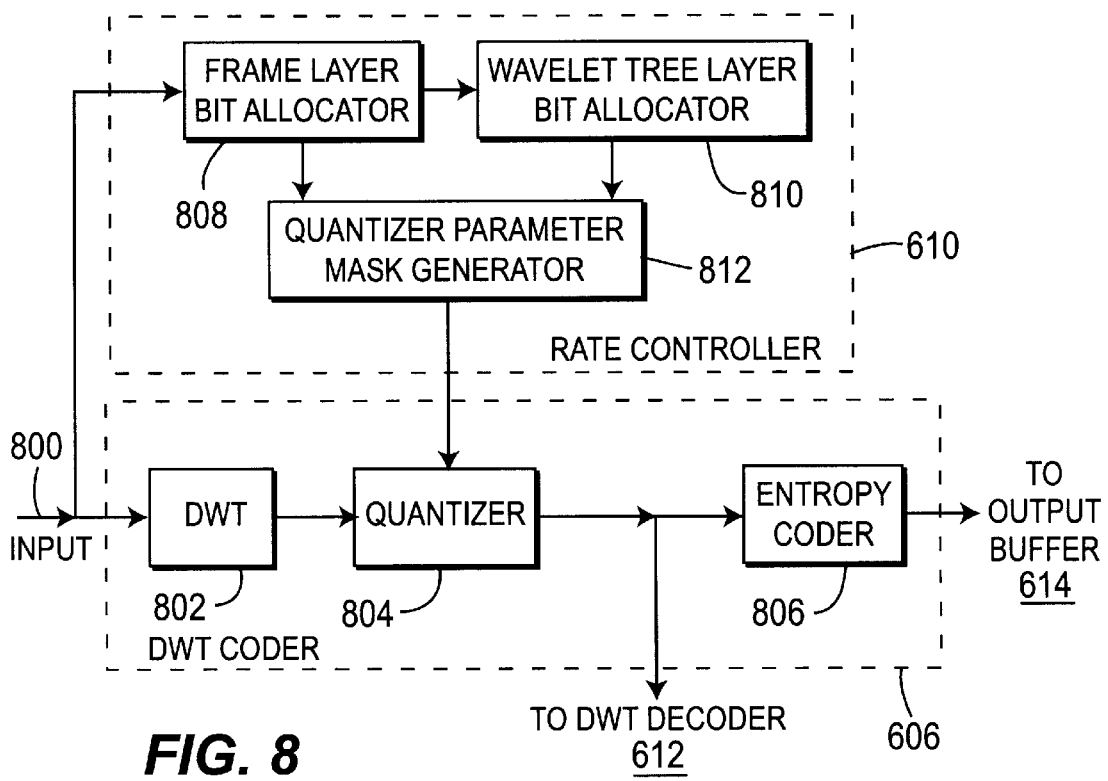
FIG. 8 is a detailed block diagram of a rate controller for controlling the coding rate of a quantizer within the wavelet-based encoder of FIG. 6.

FIG. 8 depicts a detailed block diagram of the rate controller 610 and its interconnection with the DWT coder 606. The DWT coder contains a DWT 802 connected in series with a quantizer 804 which, in turn, is connected in series with an entropy coder 806. The output of the quantizer is also connected to the DVVT decoder 612. The output signal from the entropy coder is connected to the output buffer 614. The input to the DWT coder is typically a sequence of frames containing motion compensated residuals. However, generally speaking the input sequence can be a series of frames containing any two-dimensional data. The specific nature of this data within the frames is irrelevant to the operation of the invention.

The quantizer 804 is used to quantize the coefficients of the wavelet transform. The inventive rate controller 610 controls the quantizer scale (step size) depending upon a number of parameters such that a predefined bit budget for a predefined series of frames is not exceeded during the coding process. Based upon a statistical analysis of a frame (arbitrarily, the first frame) in a sequence of video frames, the invention generates a bit budget for the next frame (a second frame). This statistical analysis is performed upon the frames prior to transformation; therefore, it is said to be accomplished at the frame layer. Processing accomplished after transformation is said to occur in the wavelet tree layer. The frame layer bit budget is allocated to each tree extending from the low-low subband. Allocation of a certain number of bits per tree is accomplished according to the number of bits already consumed in coding previous frames within the sequence, coding complexity of the present frame and buffer fullness information provided by the output buffer. The quantization parameter for each coefficient in a tree is computed based upon the bit allocation for its tree.

Assume the input video sequence to the encoder contains a series of frames having two types: intra frames (I-frames) and predictive frames (P-frames). Also, assume that an I-frame occurs in the sequence every F P-frames such that, for example, the sequence is:

... IPPPPPP ... PPPIPP ...

The total number of bits G necessary to code a Group of Frames spanning from an I-frame to the next I-frame is:

$$G = \frac{\text{bit rate} \cdot F}{\text{frame rate}} \quad (21)$$

Thus, for an encoder within a system that operates with a 64 kbps having an I-frame transmitted every 120 frames and the frames are transmitted at 30 frames per second, the total number of bits necessary to code all the frames in the group is 256 kbits, e.g., the bit budget for the sequence is 256 kbits. With such few bits to work with, it is apparent that a rate control technique that optimally allocates bit budget to the various frames is desirable.

To accomplish the optimal allocation, the rate controller 610 contains a frame layer bit allocator 808, a wavelet tree layer bit allocator 810, and a quantizer parameter mask generator 812. The frame layer allocator 808 is connected to the wavelet tree layer allocator 810 and both allocators are connected to the quantizer parameter mask generator 812. The mask generator produces a two dimensional array of quantizer parameters. This array is used to alter a nominal quantizer scale value such that an optimal bit rate is produced by the DWT coder 606. The operation of the frame layer bit allocator is discussed with respect to FIG. 9 and the operation of the wavelet tree layer bit allocator is discussed with reference to FIG. 10.

A. Allocating Bits At The Frame Layer

Figure 9:
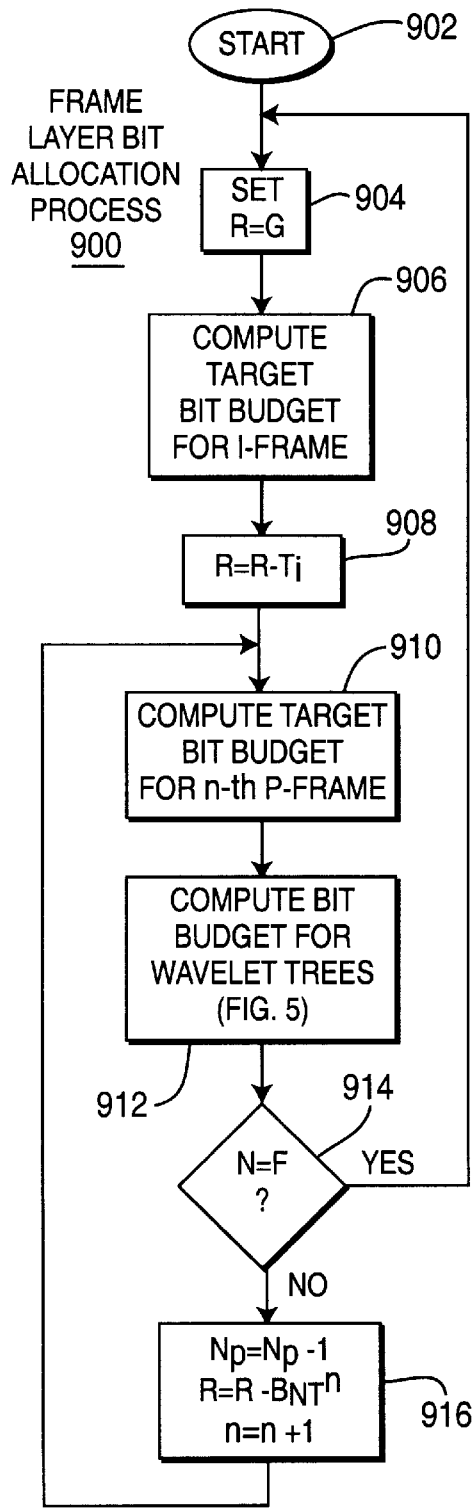
FIG. 9 is a flow chart of a frame layer bit allocation process as performed by the rate controller of FIG. 8.

FIG. 9 depicts a flow chart of the process 900 by which the frame layer bit allocator operates. The process begins at step 902 and continues with step 904. Prior to coding the first I-frame, the rate control process sets, at step 904, a variable R, representing the number of bits remaining to code the group of frames, equal to the total bit budget G. The process then establishes, at step 906, a target bit rate for the first I-frame in accordance with the following equation:

$$T_i = \frac{R}{1 + \frac{N_p X_p K_i}{X_i K_p}} \quad (22)$$

-continued with $T_i + N_p T_p = R$ initially;

then $\frac{T_p}{T_i} = \frac{X_p K_i}{X_i K_p}$ where:

$T_i$ is the target bit rate for the first I-frame;

$N_p$=F-1 is the number of P frames in the sequence;

$T_p$ is the average bit budget established for the P frames;

R is the remaining bits available for assignment;

$X_p$ is a complexity measure for a given P-frame;

$X_i$ is a complexity measure for a given I-frame;

$K_i$ is a weighting coefficient for an I-frame; and $K_p$ is a weighting coefficient for a P-frame.

The values of $X_p$ and $X_i$ are initially set as a function of the desired bit rate as follows:

$$X_i = \frac{160 \cdot \text{bit rate}}{115}; \text{ and} \quad (23)$$

$$X_p = \frac{60 \cdot \text{bit rate}}{115}.$$

Thereafter, each iteration of the process generates updated values of $X_i$ and $X_p$. The complexity measures $X_p$ and $X_i$ are updated as the frames are coded. The method used to update the complexity measure are, in the simplest form, updated by multiplying an average of the quantization parameters generated for the previous frame by the number of bits used to code the previous picture. This simple method of establishing an initial complexity value and updating that value is disclosed in International Organization for Standardization, Coded Representation of Picture And Audio: Test Model 5, ISO-IEC/JTC1/SC29JWG11, Version 1, pp. 61–64, April 1993. A better measure of complexity is disclosed above in FIGS. 2–3. Either method of computing the complexity measures is applicable to this invention.

The values of $K_p$ and $K_i$ are "universal constants" that are defined by the quantization scale value QT (described below). Generally QT is not a single value, but rather is a matrix of values that establishes a nominal quantization scale for each tree in a frame. A typical value for weighting functions $K_p$ and $K_i$ is 1.4 and 1.0, respectively.

The process updates, at step 908, the value of R after coding is complete for an I-frame:

$$R = R - T_i \quad (24)$$

The process establishes, at step 910, the target bit rate for the n-th frame in the group of frames, a P-frame, as:

$$T_p^n = R/N_p \quad (25)$$

where:

$T_p^n$ is the target bit rate for the n-th frame.

At step 912, the process computes the bit allocation for each of the wavelet trees contained in the present (n-th) frame. This is accomplished by executing the wavelet tree layer bit allocation process of FIG. 10. This process is discussed in detail below.

At step 914, the process queries whether all of the frames in the sequence have been processed, i.e., n=F. If the query is affirmatively answered, all the frames have been processed, i.e., one I-frame and (F-1) P-frames, and the process returns to step 904 to process the next group of frames. If the query is negatively answered, the process proceeds to step 916.

After coding each frame, the variables of Equation 21 are updated, at step 916, as follows:

$$N_p = N_p - 1 \quad (26)$$

$$R = R - B_{NT}^n \quad (27)$$

$$n = n+1 \quad (28)$$

where:

$B_{NT}^n$ is the actual number of bits used to code the n-th frame; and

NT is the total number of wavelet trees representing each frame.

At this point, the process has computed a bit budget for the next frame (n-th frame) that will be coded by the DWT coder. Next, the process must allocate the frame layer bit budget to each tree comprising the n-th frame.

B. Allocating Bits To Wavelet Trees

Figure 10:
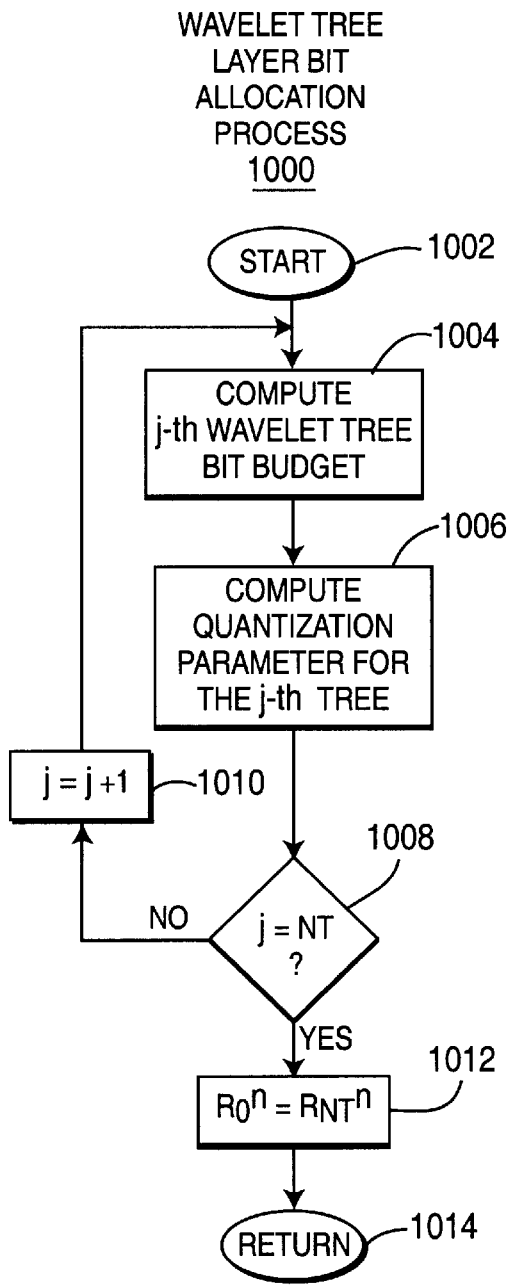
FIG. 10 is a flow chart of a wavelet tree layer bit allocation process that is a subroutine of the process of FIG. 9.

FIG. 10 depicts a flow chart of the wavelet tree layer bit allocation process 1000 representing the operation of the wavelet tree layer bit allocator. The process 1000 is entered from the process 900 at step 1002. As discussed above, each frame is represented by a plurality of wavelet trees extending from the low-low band of the decomposed input frame. Consequently, the coding bits allocated to the n-th frame must be allocated to the trees j. The process 1000 computes, at step 1004, a buffer fullness measure for each tree in the frame as:

$$R_j^n = R_0^n + B_{j-1}^n - \frac{T_n * (j-1)}{NT} \quad (29)$$

where:

$R_j^n$ is the buffer fullness measure before encoding the j-th tree;

$R_0^n$ is the initial buffer fullness measure;

$B_j^n$ is the number of bits generated by encoding all wavelet trees in the n-th frame up to and including the j-th tree;

$T_n$ is the target bit budget in the previous I or P frame (i.e., this is the approximate number of bits that will become free in the buffer when the previous frame is extracted from the buffer); and NT is the total number of wavelet trees in the present frame.

The buffer fullness measure $R_j^n$ is an indicator as to the amount of the output buffer that is presently filled with coded bits. This measure ensures that the encoder will not underflow or overflow the buffer and, as a result, lose data. Thus, the process establishes a quantization scale that varies depending upon the fullness of the output buffer.

The process then computes, at step 1006, the quantization parameter $Q_j^n$ for the j-th wavelet tree as:

$$Q_j^n = R_j^n \cdot \frac{31}{r} \quad (30)$$

$$r = 2 \cdot \frac{\text{bit rate}}{\text{frame rate}} \quad (31)$$

The quantization parameter is stored in an array of such parameters. This array, as is discussed below, forms a mask that can be used to optimally quantize the wavelet coefficients within each tree.

At step 1008, the process queries whether all the trees in the present frame have been processed, i.e., whether j=NT. If the query is affirmatively answered, the process increases, at step 1010, the tree index (J=j+1) and then returns to step 1004 to compute the buffer fullness measure for the next tree in the frame. The process proceeds through this loop until all the trees in a frame are processed by iterating for all j values until j=NT. If the query at step 1008 is negatively answered, the process proceeds along the NO path to step 1012. At step 1012, the final buffer fullness value is used to update the initial buffer fullness measure such that the buffer fullness measure when j=NT for the n-th frame is used as the initial buffer fullness measure for the n+1 frame. As such, $$R_0^n = R_{NT}^n \quad (32)$$

Once complete, the process has computed a bit allocation each tree in the frame and returns, at step 1014, to the frame layer bit allocation process 900. At this point, the rate controller has generated a quantization mask for the present frame. As such, the present frame may now be quantized and coded.

C. Adaptive Quantization

The quantization parameter mask is used to establish a quantization step size (quantizer scale) that will result in the target bit rate for each frame. The quantization step (m_quant) is computed as:

$$m\_quant = Q_j^n * QT \quad (33)$$

where:

QT is a nominal quantization scale value that may be constant for the entire sequence of frames; it may vary from frame to frame, but be constant within each frame; or it may vary within each frame.

As such, each of the values in Equation 33 may be matrix quantities. The quantization parameters, in effect, alter the value of the nominal quantization scale to ensure that the bit budget is maintained and that the bit rate at the output of the wavelet-based video encoder is substantially constant.

There has thus been shown and described a novel apparatus and method that recursively adjusts the quantizer scale for each macroblock to maintain the overall quality of the video image while optimizing the coding rate. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Apparatus for encoding an input image sequence having at least one input frame, where said frame is partitioned into at least one block, said apparatus comprising:

a block motion compensator for computing a motion vector for the block and for generating a predicted image using said motion vector;

a transform module, coupled to said block motion compensator, for applying a transformation to a difference signal between the input frame and said predicted image, where said transformation produces a plurality of coefficients;

a quantizer, coupled to said transform module, for quantizing said plurality of coefficients with a quantizer scale;

a controller, coupled to said quantizer, for selectively adjusting said quantizer scale for a current frame in response to coding information from an immediate previous encoded portion, wherein said immediate previous encoded portion is an encoded frame and wherein said coding information from said immediate previous encoded portion is used to determine $T_{P(AVG)}$, a projected average number of bits needed to code a remaining frame, where said $T_{P(AVG)}$ is expressed as:

$$T_{P(AVG)} = \text{Max}(\text{bitrate/frame rate}, R/N)$$

where R is a remaining number of bits, N is a remaining number of frames in the image sequence, bitrate is a channel bitrate and frame rate is a frame rate of the image sequences; and a coder, coupled to said quantizer, for coding said plurality of quantized coefficients.

2. The apparatus of claim 1, wherein said $T_{P(AVG)}$ is used to determine a projected number of bits $T_P(n)$ for a frame "n" in the image sequence, where said $T_P(n)$ is expressed as:

$$T_P(n) = T_{P(AVG)} * (1-w) + B(n-1) * w$$

where $B(n-1)$ is a number of bits used to code said immediate previous encoded frame and w is a weighing factor.

3. Apparatus for encoding an input image sequence having at least one input frame, where said frame is partitioned into at least one block, said apparatus comprising:

a block motion compensator for computing a motion vector for the block and for generating a predicted image using said motion vector;

a transform module, coupled to said block motion compensator, for applying a transformation to a difference signal between the input frame and said predicted image, where said transformation produces a plurality of coefficients, where said transform module applies a wavelet transform to produce a plurality of wavelet trees;

a quantizer, coupled to said transform module, for quantizing said plurality of coefficients with a quantizer scale;

a controller, coupled to said quantizer, for selectively adjusting said quantizer scale for a current frame in response to coding information from an immediate previous encoded portion; and a coder, coupled to said quantizer, for coding said plurality of quantized coefficients.

4. The apparatus of claim 3, wherein said immediate previous encoded portion is an encoded frame and wherein said coding information from said immediate previous encoded portion is used to determine $T_i$, a target bit rate for a I-frame, where said $T_i$ is expressed as:

$$T_i = \frac{R}{1 + \frac{N_p X_p K_i}{X_i K_p}}$$

where, $N_p$ is a number of P frames in the image sequence, R is a number of remaining bits available for assignment, $X_p$ is a complexity measure for a given P-frame, $X_i$ is a complexity measure for a given I-frame, $K_i$ is a weighting coefficient for an I-frame, and $K_p$ is a weighting coefficient for a P-frame.

5. The apparatus of claim 4, wherein said R and $N_p$ are used to determine $T_p^n$, a target bit rate for an n-th P-frame, where said $T_p^n$ is expressed as:

$$T_p^n = R/N_p,$$

where said R is modified in accordance with $R = R - T_i$.

6. The apparatus of claim 3, wherein said coding information from said immediate previous encoded frame is used to determine $R_j^n$, a buffer fullness measure before encoding a j-th tree, where said $R_j^n$ is expressed as:

$$R_j^n = R_0^n + B_{j-1}^n - \frac{T_n * (j-1)}{NT}$$

where $R_0^n$ is an initial buffer fullness measure, $B_j^n$ is a number of bits generated by encoding all of said wavelet trees in a n-th frame up to and including said j-th tree, $T_n$ is a target bit budget in a previous I or P frame and NT is a total number of said plurality of wavelet trees in a current frame.

7. The apparatus of claim 6, wherein said $R_j^n$ is used to determine said quantizer scale.

8. apparatus for encoding an input image sequence having at least one input frame, where said frame is partitioned into at least one block, said apparatus comprising:

a block motion compensator for computing a motion vector for the block and for generating a predicted image using said motion vector;

a transform module, coupled to said block motion compensator, for applying a transformation to a difference signal between the input frame and said predicted image, where said transformation produces a plurality of coefficients;

a quantizer, coupled to said transform module, for quantizing said plurality of coefficients with a quantizer scale;

a controller, coupled to said quantizer, for selectively adjusting said quantizer scale for a current frame in response to coding information from an immediate previous encoded portion, wherein said immediate previous encoded portion is an encoded macroblock and wherein said coding information from said immediate previous encoded portion is used to adjust a complexity model; and a coder, coupled to said quantizer, for coding said plurality of quantized coefficients.

9. The apparatus of claim 8, wherein said complexity model has a polynomial form.

10. The apparatus of claim 9, where said polynomial form is expressed as:

$$R_i = X_0 + \frac{X_1}{Q_i} + \frac{X_2}{Q_i^2}$$

where $R_i$ is a number of bits allocated to a macroblock i, $Q_i$ is a quantizer scale of said macroblock i and $X_0$, $X_1$ and $X_2$ are constants.

11. The apparatus of claim 8, wherein said coding information from said immediate previous encoded portion is further used to determine a quantizer scale modifier, γ, where said quantizer scale modifier is expressed as:

$$\gamma = \frac{T_p}{T}$$

where $T_p$ is a projected number of bits and T is a target number of bits for a current frame of the image sequence.

12. Method for encoding an input image sequence having at least one input frame, where said frame is partitioned into at least one block, said method comprising the steps of:
   computing a motion vector for the block;
   generating a predicted image using said motion vector;
   applying a transformation to a difference signal between the input frame and said predicted image, where said transformation produces a plurality of coefficients;
   quantizing said plurality of coefficients with a quantizer scale;
   selectively adjusting said quantizer scale for a current frame in response to coding information from an immediate previous encoded portion, wherein said immediate previous encoded portion is an encoded frame and wherein said coding information from said immediate previous encoded portion is used to determine $T_{P(AVG)}$, a projected average number of bits needed to code a remaining frame, where said $T_{P(AVG)}$ is expressed as:

$T_{P(AVG)}$=Max(bitrate/frame rate, R/N)

where R is a remaining number of bits, N is a remaining number of frames in the image sequence, bitrate is a channel bitrate and frame rate is a frame rate of the image sequence; and
   coding said plurality of quantized coefficients.

13. Method for encoding an input image sequence having at least one input frame, where said frame is partitioned into at least one block, said method comprising the steps of:
   computing a motion vector for the block;
   generating a predicted image using said motion vector;
   applying a transformation to a difference signal between the input frame and said predicted image, where said transformation produces a plurality of coefficients, where said transformation applying step applies a wavelet transform to produce a plurality of wavelet trees;
   quantizing said plurality of coefficients with a quantizer scale;
   selectively adjusting said quantizer scale for a current frame in response to coding information from an immediate previous encoded portion; and
   coding said plurality of quantized coefficients.

14. The method of claim 13, wherein said coding information from said immediate previous encoded frame is used to determine a buffer fullness measure before encoding a j-th tree.

15. The method of claim 14, wherein said buffer fullness measure is used to determine said quantizer scale.

16. Method for encoding an input image sequence having at least one input frame, where said frame is partitioned into at least one block, said method comprising the steps of:
   computing a motion vector for the block;
   generating a predicted image using said motion vector;
   applying a transformation to a difference signal between the input frame and said predicted image, where said transformation produces a plurality of coefficients;
   quantizing said plurality of coefficients with a quantizer scale;
   selectively adjusting said quantizer scale for a current frame in response to coding information from an immediate previous encoded portion, wherein said immediate previous encoded portion is an encoded macroblock and wherein said coding information from said immediate previous encoded portion is used to adjust a complexity model; and
   coding said plurality of quantized coefficients.

17. Method for encoding an input image sequence having at least one input frame, where said frame is partitioned into at least one block, said method comprising the steps of:
   computing a motion vector for the block;
   generating a predicted image using said motion vector;
   applying a transformation to a difference signal between the input frame and said predicted image, where said transformation produces a plurality of coefficients;
   quantizing said plurality of coefficients with a quantizer scale;
   selectively adjusting said quantizer scale for a current frame in response to coding information from an immediate previous encoded portion, wherein said immediate previous encoded portion is an encoded macroblock and wherein said coding information from said immediate previous encoded portion is used to determine a distortion measure for a current macroblock; and
   coding said plurality of quantized coefficients.

18. A computer-readable medium having stored thereon a plurality of instructions, the plurality of instructions including instructions which, when executed by a processor, cause the processor to perform the steps comprising of:
   computing a motion vector for the block;
   generating a predicted image using said motion vector;
   applying a transformation to a difference signal between the input frame and said predicted image, where said transformation produces a plurality of coefficients;
   quantizing said plurality of coefficients with a quantizer scale;
   selectively adjusting said quantizer scale for a current frame in response to coding information from an immediate previous encoded portion, wherein said immediate previous encoded portion is an encoded frame and wherein said coding information from said immediate previous encoded portion is used to determine $T_{P(AVG)}$, a projected average number of bits needed to code a remaining frame, where said $T_{P(AVG)}$ is expressed as:

$T_{P(AVG)}$=Max(bitrate/frame rate, R/N)

where R is a remaining number of bits, N is a remaining number of frames in the image sequence, bitrate is a channel bitrate and frame rate is a frame rate of the image sequence; and
   coding said plurality of quantized coefficients.

19. A computer-readable medium having stored thereon a plurality of instructions, the plurality of instructions including instructions which, when executed by a processor, cause the processor to perform the steps comprising of:
   computing a motion vector for the block;
   generating a predicted image using said motion vector;
   applying a transformation to a difference signal between the input frame and said predicted image, where said transformation produces a plurality of coefficients, where said transformation applying step applies a wavelet transform to produce a plurality of wavelet trees;

quantizing said plurality of coefficients with a quantizer scale;

selectively adjusting said quantizer scale for a current frame in response to coding information from an immediate previous encoded portion; and coding said plurality of quantized coefficients.

20. The computer-readable medium of claim 19, wherein said coding information from said immediate previous encoded frame is used to determine a buffer fullness measure before encoding a j-th tree.

21. The computer-readable medium of claim 20, wherein said buffer fullness measure is used to determine said quantizer scale.

22. A computer-readable medium having stored thereon a plurality of instructions, the plurality of instructions including instructions which, when executed by a processor, cause the processor to perform the steps comprising of:

computing a motion vector for the block;

generating a predicted image using said motion vector;

applying a transformation to a difference signal between the input frame and said predicted image, where said transformation produces a plurality of coefficients;

quantizing said plurality of coefficients with a quantizer scale;

selectively adjusting said quantizer scale for a current frame in response to coding information from an immediate previous encoded portion, wherein said immediate previous encoded portion is an encoded macroblock and wherein said coding information from said immediate previous encoded portion is used to adjust a complexity model; and coding said plurality of quantized coefficients.

23. A computer-readable medium having stored thereon a plurality of instructions, the plurality of instructions including instructions which, when executed by a processor, cause the processor to perform the steps comprising of:

computing a motion vector for the block;

generating a predicted image using said motion vector;

applying a transformation to a difference signal between the input frame and said predicted image, where said transformation produces a plurality of coefficients;

quantizing said plurality of coefficients with a quantizer scale;

selectively adjusting said quantizer scale for a current frame in response to coding information from an immediate previous encoded portion, wherein said immediate previous encoded portion is an encoded macroblock and wherein said coding information from said immediate previous encoded portion is used to determine a distortion measure for a current macroblock; and coding said plurality of quantized coefficients.

* * * * *